F. A. GODDARD.
Corn-Planter.
No. 29,433.
Patented July 31, 1860.
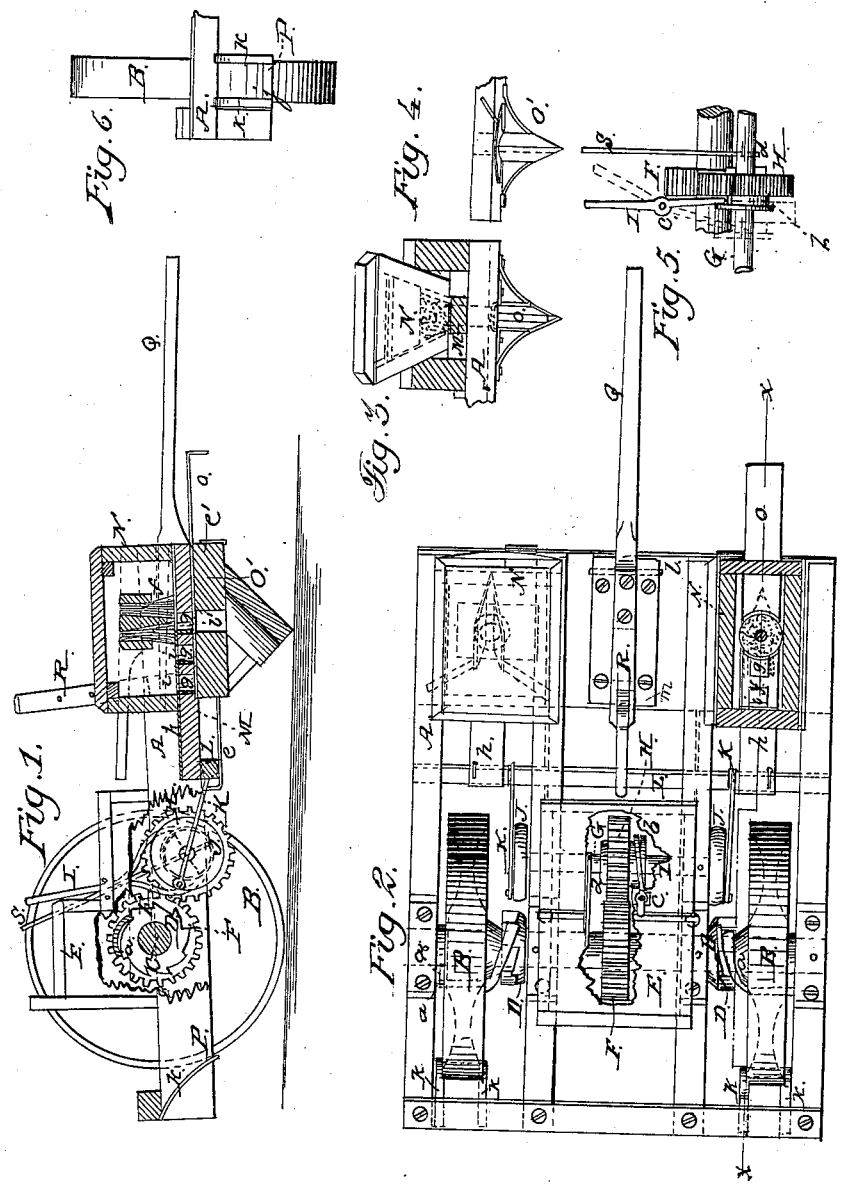
WITNESSES.
INVENTOR:

UNITED STATES PATENT OFFICE.

F. A. GODDARD, OF LEXINGTON, ILLINOIS, ASSIGNOR TO HIMSELF AND JNO. H. KENNADAY, OF SAME PLACE.

IMPROVEMENT IN CORN-PLANTERS.

Specification forming part of Letters Patent No. 29,433, dated July 21, 1860.

*To all whom it may concern:*

Be it known that I, F. A. GODDARD, of Lexington, in the county of McLean and State of Illinois, have invented a new and Improved Corn-Planter; and I do hereby declare that the following is a full, clear, and exact description of the same, reference being had to the annexed drawings, making a part of this specification, in which—

Figure 1 is a side sectional view of my invention, taken in the line $x$ $x$, Fig. 2; Fig. 2, a plan sectional view of the same; Fig. 3, a detached back view of one of the seed-boxes; Fig. 4, a detached front view of one of the furrow-openers; Fig. 5, a detached view of the gearing by which motion is given the seed-slides; Fig. 6, a detached back view of one of the wheels of the machine with its scraper.

Similar letters of reference indicate corresponding parts in the several figures.

This invention relates to an improved corn-planting machine of that class designed for planting either in drills or check-rows.

The object of the invention is to obtain a simple and efficient machine that may be very readily adapted for the different work required of it, and one that may be readily manipulated and be under the complete control of the driver.

To enable those skilled in the art to fully understand and construct my invention, I will proceed to describe it.

A represents a rectangular frame, which is mounted on two wheels, B B. These wheels B are placed loosely on their axle C, and are connected with it when rotating forward by means of pawls $a$, which are attached to the inner sides of the wheels and engage with ratchets D on the axle during the forward rotation of the wheels, thereby causing the axle to rotate with the wheels as the latter rotate forward.

E is the driver's seat, which is placed on the frame A between the wheels B B; and F is a toothed wheel, which is secured on the axle C directly under the seat E.

In the frame A and directly in front of the axle C there is a shaft, G, on which there is placed loosely a toothed wheel, H. This wheel H has a grooved hub, $b$, into which the forked end of a lever, I, is fitted, said lever having its fulcrum at $c$ and extending upward within reach of the driver on seat E, as shown clearly in Fig. 1. The shaft G has a pin, $d$, passing through it, which pin serves as a clutch to engage the wheel H when the latter is shoved in gear with the wheel F on the axle C, which may be effected by actuating lever I. (See Figs. 2 and 5.)

At each end of the shaft G there is secured a crank-pulley, J, and to these pulleys rods K are attached, the front ends of which are secured to a slide-bar, L, which is fitted transversely in guides $e$ at the under side of the frame A, and has two seed-slides, M M, attached. The seed-slides M M work on the bottoms $e'$ of seed-boxes N N, which are placed on the frame A—one at each side—each seed-box being provided with a cut-off brush, $f$, and each seed-slide M provided with three seed-cells, $g$, the capacity of which may be varied, as desired, by adjusting a plate, $h$, which is placed on the top of each slide, and is provided with pendants $i$, which extend down into the seed-cells, as shown clearly in Fig. 1. Between the bottoms $e'$ of the seed-boxes N and the slides M there are placed slides O, by which either seed-box may be cut off or closed to prevent the distribution of seed therefrom. The bottoms $e'$ of the seed-boxes N N are each provided with a discharge-opening, $i'$, and these openings are in line with the cut-off brushes $f$ in the seed-boxes N, as shown clearly in Fig. 1.

To the under side of each bottom $e'$ there is attached an inclined trough or guide-spout, O', of V form in its transverse section. These troughs or spouts O' are inclined at an angle of about forty-five degrees, and they have a colter-edge and a polished surface and serve the double purpose of shares or furrow-openers and seed-conveying spouts. The spouts O' are in line with the wheels B.

To the frame A, and directly behind each wheel B, there is attached a scraper, P. These scrapers are horizontal metal plates $j$, secured to the lower ends of elastic plates $k$, which have a tendency to keep the plates $k$ pressed against the wheels B.

Q is the draft-pole, which is secured to the frame A by a horizontal rod or bolt, $l$. Through the draft-pole and at a point back of the bolt $l$ a bar, R, passes vertically, the bar R being attached at its lower end to the frame A by a joint, $m$. The bar R is perforated with holes, and the back end of the draft-pole extends nearly to the driver's seat and within reach of the driver, so that the driver can grasp the back end of the pole and secure it higher or lower on the bar R by means of a pin. By this arrangement the spouts and furrow-openers O' may be made to penetrate the ground at a greater or less depth, and also be elevated entirely above it, when desired, as in moving from place to place, turning at the ends of furrows, &c. The spouts and furrow-openers form a smooth furrow, effectually working their way through tough clay soil and performing as well in such as in light sandy soils. The slides M distribute the seed, as usual, while the wheels B cover it, the scrapers P keeping the peripheries of the wheel perfectly clean.

When it is desired to plant in drills the seed-slides are operated from the axle C, the wheel H being shoved in gear with the wheel F; but when it is desired to plant in check-rows the wheel H is shoved out of gear with wheel F, and a lever, S, is fitted in the shaft G and the latter actuated by hand. The connecting of the wheels to their axles by the pawls $a$ and ratchets D prevents the useless distribution of seed as the machine is backed.

I do not claim the scrapers P, nor the ratchets D and pawls $a$, by which a connection is formed between the wheels and their axle as the former rotate forward; but I do claim as new and desire to secure by Letters Patent—

The arrangement of the shifting wheel H on shaft G with the permanent wheel F on the axle C, in combination with the removable lever S in shaft G, as and for the purpose set forth.

F. A. GODDARD.

Witnesses:
GEO. B. OKESON,
THOMAS F. TIPTON.